(12) United States Patent
Weyer

(10) Patent No.: US 10,088,928 B2
(45) Date of Patent: Oct. 2, 2018

(54) METHOD VEHICLE INPUT/OUTPUT DEVICE AND METHOD

(71) Applicant: GM GLOBAL TECHNOLOGY OPERATIONS LLC, Detroit, MI (US)

(72) Inventor: Holger Weyer, Mainz (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 451 days.

(21) Appl. No.: 14/724,149

(22) Filed: May 28, 2015

(65) Prior Publication Data

US 2015/0346888 A1  Dec. 3, 2015

(30) Foreign Application Priority Data

May 28, 2014  (DE) .................. 10 2014 008 040

(51) Int. Cl.
| | |
|---|---|
| *G06F 3/041* | (2006.01) |
| *G06F 3/0362* | (2013.01) |
| *G06F 3/0354* | (2013.01) |
| *G06F 3/01* | (2006.01) |

(52) U.S. Cl.
CPC .......... *G06F 3/0412* (2013.01); *G06F 3/0362* (2013.01); *G06F 3/03548* (2013.01); *B60K 2350/102* (2013.01); *B60K 2350/1024* (2013.01); *G06F 3/016* (2013.01)

(58) Field of Classification Search
CPC .. G06F 3/0412; G06F 3/03548; G06F 3/0362; G06F 3/0484; B60K 35/00; G01C 23/00

USPC .................................................. 345/173, 174
See application file for complete search history.

(56) References Cited

U.S. PATENT DOCUMENTS

| | | | | |
|---|---|---|---|---|
| 5,956,016 A | * | 9/1999 | Kuenzner | B60K 35/00 345/156 |
| 7,361,854 B2 | | 4/2008 | Basche et al. | |
| 9,201,536 B2 | * | 12/2015 | Imai | G06F 3/0412 |
| 9,214,507 B2 | * | 12/2015 | Mathew | H05B 33/0896 |
| 9,684,392 B2 | * | 6/2017 | Kamiyama | G06F 3/03548 |
| 2002/0198634 A1 | * | 12/2002 | Shimazaki | G01C 21/3614 701/1 |
| 2011/0202272 A1 | * | 8/2011 | Feyereisen | G01C 23/00 701/532 |
| 2012/0019463 A1 | * | 1/2012 | Ng | B60K 35/00 345/173 |
| 2013/0054863 A1 | * | 2/2013 | Imes | H04L 12/2827 710/304 |
| 2013/0057500 A1 | | 3/2013 | Kulczycki | |
| 2013/0222343 A1 | * | 8/2013 | Huynh | B60K 35/00 345/174 |

(Continued)

FOREIGN PATENT DOCUMENTS

| | | |
|---|---|---|
| DE | 102004019893 A1 | 11/2005 |
| DE | 102004031659 A1 | 6/2006 |
| DE | 102010025632 A1 | 1/2012 |

*Primary Examiner* — Fred Tzeng
(74) *Attorney, Agent, or Firm* — Lorenz & Kopf, LLP

(57) ABSTRACT

An input/output device for a motor vehicle includes a base area and at least one local elevation adjoining the same. The base area is preferably enclosed by and/or integrally formed with the local elevation(s). The local elevation(s) includes a touch-sensitive surface for inputting control element actuating information for the motor vehicle by touching, (e.g., manually sliding) the fixed surface.

19 Claims, 1 Drawing Sheet

(56) References Cited

U.S. PATENT DOCUMENTS

2014/0282049 A1\* 9/2014 Lyon .................... G06F 3/0484
                                                        715/744

\* cited by examiner

METHOD VEHICLE INPUT/OUTPUT DEVICE AND METHOD

CROSS-REFERENCE TO RELATED APPLICATION

This application claims priority to German Patent Application No. 102014008040.4, filed May 28, 2014, which is incorporated herein by reference in its entirety.

TECHNICAL FIELD

The present disclosure pertains to an input/output device for a motor vehicle, to a motor vehicle, in particular a passenger car having such an input/output device and to a method for inputting control element actuating information for such a motor vehicle and to a computer program product for carrying out such a method.

BACKGROUND

Movable control elements such as rotary or sliding knobs in motor vehicles are generally known in order to input control element actuating information for the motor vehicle, for example a change of blower speed, set point temperature, volume, a destination or the like. Such moveable control elements are mechanically involved. Fixed touch-sensitive surfaces are alternatively also generally known in order to input control element actuating information for the motor vehicle by manually touching (e.g., in a sliding manner) a fixed surface. These surfaces are generally smooth so that the operator does not receive any haptic guidance as provided by the moveable control elements.

SUMMARY

Accordingly, the present disclosure provides an improvement in the input and output of information for a motor vehicle. According to an aspect of the present disclosure, an input/output device includes a base area having at least one, and optionally multiple, local elevations adjoining the base area. The base area in an embodiment is at least substantially flat or curved in at least one dimension. In an embodiment, the base area is connected to an interior of the motor vehicle, in particular an instrument panel or center console in a permanent (i.e., fixed) or detachable (i.e., movable) manner. The local elevations in an embodiment are partly or completely enclosed or surrounded by the base area and/or merge into these. In an embodiment, the local elevations are integrally formed with the base area.

The local elevations and/or the base area in an embodiment are equipped for actively displaying (e.g., changing) graphic information, and may include or be formed by a screen surface for optically displaying alternative graphic information.

The base area in an embodiment is additionally or alternatively equipped for inputting information for the motor vehicle by manually touching the base area. In particular, the same base area can be equipped for actively displaying graphic information and for inputting information for the motor vehicle by manually touching in particular in the manner of a so-called touch screen.

According to an aspect of the present disclosure, the local elevations include a touch-sensitive surface for inputting control element actuating information for the motor vehicle by touching (e.g., manually sliding) this fixed surface.

As a result, a known mechanically moveable control element such as a rotary or sliding knob or switch can be replicated in an embodiment by a touch-sensitive surface, in particular a touch screen. In this way, the haptic guidance of such a control element in an embodiment can be advantageously made available without an elaborate and/or error-prone mechanism. Accordingly, control element actuating information can replicate information regarding a position or movement of a mechanical control element, for example a rotary position or twisting of a rotary knob or a position or sliding of a sliding switch.

Inputting information by touching (e.g., manually sliding) the base area and/or the fixed touch-sensitive surface of the local elevations in an embodiment is effected in a capacitive, inductive, thermal or optical manner. Accordingly, in an embodiment, the base area and/or the touch-sensitive surface(s) are equipped for the capacitive, inductive, thermal or optical detection of a manual, in particular sliding touch.

In an embodiment, the touch-sensitive surface is permanently fixed relative to the base area, and may be formed by suitably forming of a carrier, on which a touch-sensitive screen is arranged in three dimensions, and which forms the elevations and/or the base area. Equally, the touch-sensitive surface can also be retractable and extendable relative to the base area, for example by an adjustable carrier. It is, however, preferably not moved by the manual touch for inputting the control element actuating information and thus fixed.

The touch-sensitive surface of the local elevations and/or the base area in an embodiment can include a TFT or LED display, in particular an OLED display. Such a display is particularly suitable for three dimensionally forming the elevation because of its deformability.

In an embodiment, the local elevations project relative to the base area, in particular the boundary of the same, and transition to the elevation, in each case by in a range preferably between 2 mm and 15 mm. As a result, an advantageous haptic guidance in an embodiment can be made available. In addition or alternatively, the projection in an embodiment amounts to a range preferably between 5 cm and 15 mm. As a result, an advantageous relatively even base area can be made available in an embodiment.

In an embodiment, the local elevations each have a base area projected in a plane of the base area, and/or a surface up to the boundary having a transition to the base area in a range preferably between 1 cm$^2$ and 9 cm$^2$. As a result, advantageous haptic guidance can be made available in an embodiment. In addition or alternatively, the base area and/or surface in an embodiment can amount to a range preferably between 40 cm$^2$ and 10 cm$^2$. As a result, an advantageously relatively even base area can be made available in an embodiment.

In an embodiment, the local elevations are each designed at least substantially rotary knob or sliding knob-shaped. As a result, the usual feel and/or impression of known mechanical rotary knobs or sliding knobs or switches can be represented in an embodiment. In particular, the local elevations in an embodiment can each be formed at least substantially in a cuboid, dome-shaped or conical, in particular cylindrical manner.

In an embodiment, the base area includes at least one local recess which partially or completely encloses or surrounds the local elevation. The recess, in an embodiment, has a maximum depth in a range preferably between 1 cm and 5 mm. As a result, an advantageous haptic guidance can be made available in an embodiment.

In addition to their touch-sensitive surface, the local elevations in an embodiment each have at least one local switching surface for inputting further control element actuating information for the motor vehicle.

A local switching surface in turn may include a (further) touch-sensitive surface of inputting the further control element actuating information by manually touching this switching surface. In an embodiment, the local switching surface further control element actuating information and the touch-sensitive surface of the local elevation for inputting the control element actuating information for the motor vehicle by touching (e.g., manually sliding) this fixed surface are formed integrally with one another. For this purpose, the local switching surface in an embodiment can be actively displayed, for example optically displayed by a screen surface of the elevation.

Additionally or alternatively to a touch-sensitive surface, a local switching surface can be adjustable, in particular depressible. Accordingly, in an embodiment, a mechanical pushbutton or rocker switch may be arranged on a fixed local elevation, the touch-sensitive surface of which replicates a mechanical rotary or sliding knob or switch.

According to an aspect of the present disclosure, a touch (e.g., manually sliding) of the touch-sensitive surface of a local elevation is detected by a detector or sensor equipped for this purpose and, in particular allocated to control element actuating information for the motor vehicle. Accordingly, the input/output device in an embodiment includes a detector or sensor for detecting a touch (e.g., manually sliding) of the touch-sensitive surface of the local elevation and for allocating control element actuating information to the detected touch.

In an embodiment, actuating a previously explained local switching surface is detected by another detector or sensor equipped for this purpose and allocated to further control element actuating information for the motor vehicle. Accordingly, in an embodiment, the input/output device includes a detector or sensor for detecting an actuation of one or multiple fixed or adjustable local switching surfaces for inputting in each case at least one further control element actuating information for the motor vehicle, which include the local elevation in addition to their touch-sensitive surface for allocating further control element actuating information to the detected actuation.

Inputting information through touching of the base area and/or of the fixed touch-sensitive surface switching surface of the local elevations in an embodiment is performed capacitively, inductively, thermally or optically. Accordingly, in an embodiment, the base area and/or the touch-sensitive surfaces and/or local switching surfaces or the (further) detectors or sensors are equipped for the capacitive, inductive, thermal or optical detection of a manual, in particular sliding touch.

In an embodiment, and in particular visual, thermal, electric and/or haptic actuation feedback based on a sliding touch of the touch-sensitive surface of the local elevation is output by a feedback device equipped for this purpose. Accordingly, in an embodiment, the input/output device includes a feedback mechanism for outputting an in particular visual, thermal, electric and/or haptic actuation feedback based on a detected, in particular sliding touch of the touch-sensitive surface of the local elevation.

A visual actuation feedback can include a corresponding graphic display such as for example a scale varying with the touch, a pointer moving with the touch, a color change or the like. A haptic actuation feedback can include vibration of the local elevation.

A means according to the present disclosure can be formed by hardware and/or software, in particular include an in particular digital processing in particular microprocessor unit (CPU) and/or one or multiple programs or program modules which are preferentially data or signal connected to a storage and/or bus system. The CPU can be designed in order to execute commands which are implemented as a program stored in a storage system, detect input signal from a data bus and/or emit output signals to a data bus. A storage system can include one or multiple in particular different storage media, in particular optical, magnetic, solid-state and/or other non-volatile media. The program can be of such a nature that it embodies or is capable of carrying out the method described here so that the CPU can execute the steps of such methods and thereby detect and allocate a manual touch or actuation to a (further) control element actuating information.

BRIEF DESCRIPTION OF THE DRAWINGS

The present disclosure will hereinafter be described in conjunction with the following drawing figures, wherein like numerals denote like elements.

DETAILED DESCRIPTION OF THE DRAWINGS

Figure 1:
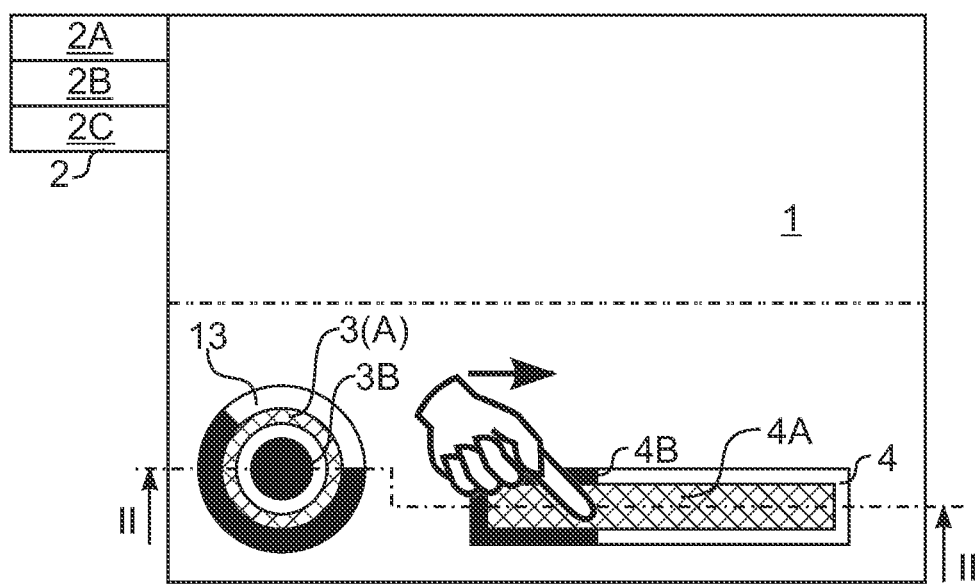
FIG. 1 illustrates an input/output device a met for inputting control element actuating information for a motor vehicle in accordance to an embodiment of the present disclosure.

The following detailed description is merely exemplary in nature and is not intended to limit the invention or the application and uses of the invention. Furthermore, there is no intention to be bound by any theory presented in the preceding background of the invention or the following detailed description.

The input/output device includes a base area in the form of a touch screen with a touch-sensitive OLED display 1, which is equipped for actively displaying graphic information and for capacitively detecting a manual touch. To this end the display 1 is signal connected to a detection means 2a of a CPU 2. It is fixed or immovable and permanently or detachably connected to a center console of the motor vehicle.

Two local elevations 3, 4 are integrally formed with the base area 1, which accordingly merge into the base area 1. To this end, a carrier 5, on which the OLED display 1 is fastened, includes corresponding three-dimensional moldings so that the base area 1 encloses the elevations 3, 4.

Figure 2:
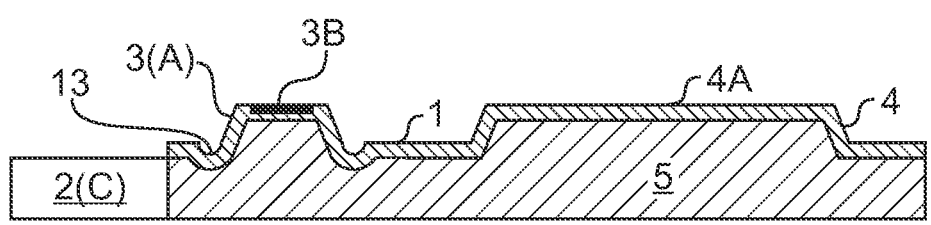
FIG. 2 shows a section along the angled section line II-II in FIG. 1.

In FIGS. 1 and 2, the left local elevation 3 is designed to replicate a rotary knob-shaped in particular as a conical feature. The right local elevation 4 is designed to replicate a sliding knob-shaped, in particular as a cuboid feature.

Each local elevation 3, 4 has a touch-sensitive surface 3a and 4a respectively for inputting control element actuating information for the motor vehicle by manually sliding touching this fixed surface 3a, 4a, which in FIG. 1 is indicated in a cross-hatched manner. In the left local elevation 3, the touch-sensitive surface 3a forms a surface of a cone, and in the right local elevation 4, the touch-sensitive surface 4a forms a cuboid surface.

A local recess 13 of the base area 1 completely surrounds the left local elevation 3. This left local elevation 3 additionally to the touch-sensitive surface 3a includes a touch-sensitive fixed or a mechanically adjustable (vertical in FIG. 2) local switching surface 3b for inputting further control element actuating information for the motor vehicle, which for this purpose is signal-connected to a further detection means 2b of the CPU 2. A touch-sensitive fixed local switching surface 3b can be designed in particular by a detection region of the OLED display that is defined in particular in a program or computer-based manner.

Through the detection means 2a, a manual sliding touch of the touch-sensitive surface 3a or 4a of the local elevation 3 and 4 respectively, as indicated in FIG. 1 by a finger, is detected and allocated to control element actuating information by an allocation means 2c of the CPU 2.

Accordingly, the sliding touch of the touch-sensitive surface 4a indicated, for example in FIG. 1, is allocated control element actuating information which corresponds to a sliding of a sliding switch replicated by the elevation 4, for example in order to regulate a temperature or volume or the like. In like manner, a sliding touch of the touch-sensitive surface 3a can be assigned to control element actuating information corresponding to a turning of a rotary knob replicated by the elevation 3, for example in order to regulate a temperature or volume or the like.

Through the further detector or sensor 2b, a manual actuation of the local switching surface 3b of the local elevation 3 is detected and through the allocation means 2c allocated to further control element actuating information, for example in order to confirm a selection, switch over a mode or the like.

The input/output device includes sheet back means for outputting a visual actuation feedback based on a sliding touch of the touch-sensitive surface 4a of the local elevation 4. To this end, the allocation means 2c brings about a corresponding display on the outer surface 4b of the local elevation 4, which in FIG. 1 is indicated by coloring a sliding region. In like manner, the recess 13 of the touch screen 1 can be graphically activated in the form of a scale, a pointer or the like, as indicated in FIG. 1 by coloring a rotary position. The recess 13 and the outer surface 4b of the touch screen 1 thus form the feedback means together with the allocation means 2c activating the same.

Although in the preceding description exemplary embodiments were explained it is pointed out that a multitude of modifications is possible. Accordingly, the base area 1 may be formed only in an upper region indicated in a dash-double dotted manner in FIG. 1 for actively displaying graphic information, while the elevations 3, 4 in particular their touch-sensitive surfaces 3a, 4a are only designed for capacitively detecting a manual sliding touch, but not for actively displaying graphic information.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An input/output device for a motor vehicle comprising a touch-sensitive display including:
    a base area having a display surface;
    a three-dimensional local elevation extending out of the display surface such that the local elevation is enclosed by and merges into the base area to define a fixed control element; and
    a touch-sensitive surface formed on the fixed control element for inputting actuating information by touching the touch-sensitive surface.

2. The input/output device according to claim 1, wherein at least one of the local elevation and the base area is configured to actively display graphic information.

3. The input/output device according to claim 1, wherein at least one of the local elevation and the base area comprises a TFT display.

4. The input/output device according to claim 1, wherein at least one of the local elevation and the base area comprises an LED display.

5. The input/output device according to claim 4, wherein at least one of the local elevation and the base area comprises an OLED display.

6. The input/output device according to claim 1, wherein the base area is configured to input information by manually touching a fixed base area.

7. The input/output device according to claim 1, wherein the local elevation relative to the base area projects above the display surface in a range between 2 mm and 15 mm.

8. The input/output device according to claim 7, wherein the display surface has an area in a range between 10 $cm^2$ and 40 $cm^2$.

9. The input/output device according to claim 1, wherein the display surface has an area in a range between 10 $cm^2$ and 40 $cm^2$.

10. The input/output device according to claim 1, wherein the local elevation replicates at least one of a knob-shaped control element or a slider-shaped control element.

11. The input/output device according to claim 1, wherein the base area further comprises a local recess at least partly surrounding the local elevation.

12. The input/output device according to claim 1, wherein the local elevation further comprises at least one local switching surface configured to input switching information.

13. The input/output device according to claim 1, further comprising a detector configured to detect a manual touch of the touch-sensitive surface and allocate the actuating information to the detected touch.

14. The input/output device according to claim 13 further comprising a second detector configured to detect a manual touch on a local switching surface for inputting switching information and allocate switching information to the detected touch.

15. The input/output device according to claim 1, further comprising a feedback device configured to output at least one of a visual feedback, thermal feedback, electric feedback, haptic feedback or combinations thereof based on a touch of the touch-sensitive surface.

16. A motor vehicle comprising a passenger car having an input/output device according to claim 1, wherein the base area is connected in a fixed manner to an interior of the passenger car.

17. A method for inputting control element actuating information on an input/output device according to claim 1, further comprising manually touching the touch-sensitive surface on the control element with a sliding movement which is detected and allocated to actuating information for the motor vehicle.

18. The method according to claim 17, further comprising manually touching a local switching surface on the local elevation which is detected and allocated to switching information.

19. The method according to claim 17, further comprising outputting a feedback in the form of at least one of a visual feedback, a thermal feedback, an electric feedback, a haptic feedback or combination thereof in response to a sliding touch of the touch-sensitive surface of the control element.

* * * * *